United States Patent
Ou et al.

(10) Patent No.: US 8,694,377 B2
(45) Date of Patent: Apr. 8, 2014

(54) METHOD AND APPARATUS FOR PRESENTING ADVERTISEMENTS

(75) Inventors: Canhui Ou, Danville, CA (US); J. Bradley Bridges, San Antonio, TX (US); Charles R. Kalmanek, Jr., Short Hills, NJ (US); Raghvendra G. Savoor, Walnut Creek, CA (US); Albert Greenberg, Summit, NJ (US); Stephen A. Sposato, Lafayette, CA (US); Zhi Li, San Ramon, CA (US); Jerold D. Osato, Pinole, CA (US); Alexandre Gerber, Madison, NJ (US); Oliver Spatscheck, Randolph, NJ (US); Sun-Uk Park, Union City, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 951 days.

(21) Appl. No.: 12/418,430

(22) Filed: Apr. 3, 2009

(65) Prior Publication Data

US 2009/0198569 A1 Aug. 6, 2009

Related U.S. Application Data

(62) Division of application No. 11/458,164, filed on Jul. 18, 2006.

(51) Int. Cl.
*G06Q 30/00* (2012.01)
(52) U.S. Cl.
USPC ................................................ 705/14.66

(58) Field of Classification Search
None
See application file for complete search history.

(56) References Cited

U.S. PATENT DOCUMENTS

| 6,487,538 | B1 | 11/2002 | Gupta et al. |
| 7,039,599 | B2 | 5/2006 | Merriman et al. |
| 2002/0029267 | A1 * | 3/2002 | Sankuratripati et al. ...... 709/224 |
| 2003/0149581 | A1 | 8/2003 | Chaudhri et al. |
| 2004/0107137 | A1 | 6/2004 | Skinner |
| 2004/0158528 | A1 | 8/2004 | Zuili |
| 2005/0033641 | A1 * | 2/2005 | Jha et al. ........................ 705/14 |
| 2005/0080665 | A1 | 4/2005 | Bowman-Amuah |
| 2005/0289120 | A9 | 12/2005 | Soulanille et al. |
| 2006/0069616 | A1 * | 3/2006 | Bau ................................ 705/14 |
| 2006/0080239 | A1 | 4/2006 | Hartog |
| 2008/0033641 | A1 | 2/2008 | Medalia |
| 2008/0040224 | A1 * | 2/2008 | Roker ............................ 705/14 |

OTHER PUBLICATIONS

CISCO Systems, Inc., "CISCO IOS Flexible Netflow Overview", pp. 1-8, http://www.cisco.com/en/US/docs/ios/fnetflow/configuration/guide fnetflow_overview_ps6 . . . Website last visited Apr. 2, 2009.

* cited by examiner

*Primary Examiner* — Daniel Sorkowitz
(74) *Attorney, Agent, or Firm* — Guntin & Gust, PLC; Andrew Gust

(57) ABSTRACT

A system that incorporates teachings of the present disclosure may include, for example, a controller to determine a behavioral profile of an end user from packet traffic generated by activities of the end user, and share the behavioral profile with a network element for distributing targeted advertisements to the end user according to the behavioral profile. Additional embodiments are disclosed.

20 Claims, 4 Drawing Sheets

300

METHOD AND APPARATUS FOR PRESENTING ADVERTISEMENTS

CROSS REFERENCE

This application is a divisional of U.S. patent application Ser. No. 11/458,164, filed Jul. 18, 2006, the disclosure of which is hereby incorporated by reference in its entirety.

FIELD OF THE DISCLOSURE

The present disclosure relates generally to communication services and more specifically to a method and apparatus for presenting advertisements.

BACKGROUND

Online advertising has evolved from the early non-contextual pay-per-impression model to the currently predominant contextual pay-per-click model. In non-contextual pay-per-impression model, ads are placed on publishers' websites with little or no regard to visitors' interest. Payment from advertisers to ad brokers and from ad brokers to publishers are typically tied to the number of times a particular ad is displayed to visitors, hence the name pay per impression.

This model has in large part been replaced by the contextual pay-per-click model so that payment of an ad is directly tied into its performance. Advertisers only pay for the clicks (or number of times an ad was clicked by users), not the impressions or number of times an ad was displayed. Thus, in contextual pay-per-click online advertising models, the success of an ad is measured by its click-thru rate, which is defined as the number of times the ad is clicked by any user over the number of times the ad was displayed. Consequently, the more targeted the content, the higher the click-thru rate, and the more revenue for ad brokers and website publishers.

Typically, ad brokers profile subscribers via cookies. Cookies from an ad broker track end user clicks on the ads provided by the ad broker. An ad broker has no visibility to websites which an end user visits. As a result, an ad broker's ability to profile an end user is limited.

DETAILED DESCRIPTION

An embodiment of the present disclosure can entail a computer-readable storage medium having computer instructions to monitor packet traffic associated with an end user from one or more network elements of a communication system providing communication services to a messaging device of the user causing the packet traffic, determine a behavioral profile of the end user from the monitored packet traffic, and submit to an advertisement element the behavioral profile.

Another embodiment of the present disclosure can entail a system having a controller to determine a behavioral profile of an end user from packet traffic generated by activities of the end user, and share the behavioral profile with a network element for distributing targeted advertisements to the end user according to the behavioral profile.

Yet another embodiment of the present disclosure can determining a behavioral profile of an end user from packet traffic initiated by the end user, and providing one or more systems access to the behavioral profile to identify advertisement.

Figure 1:
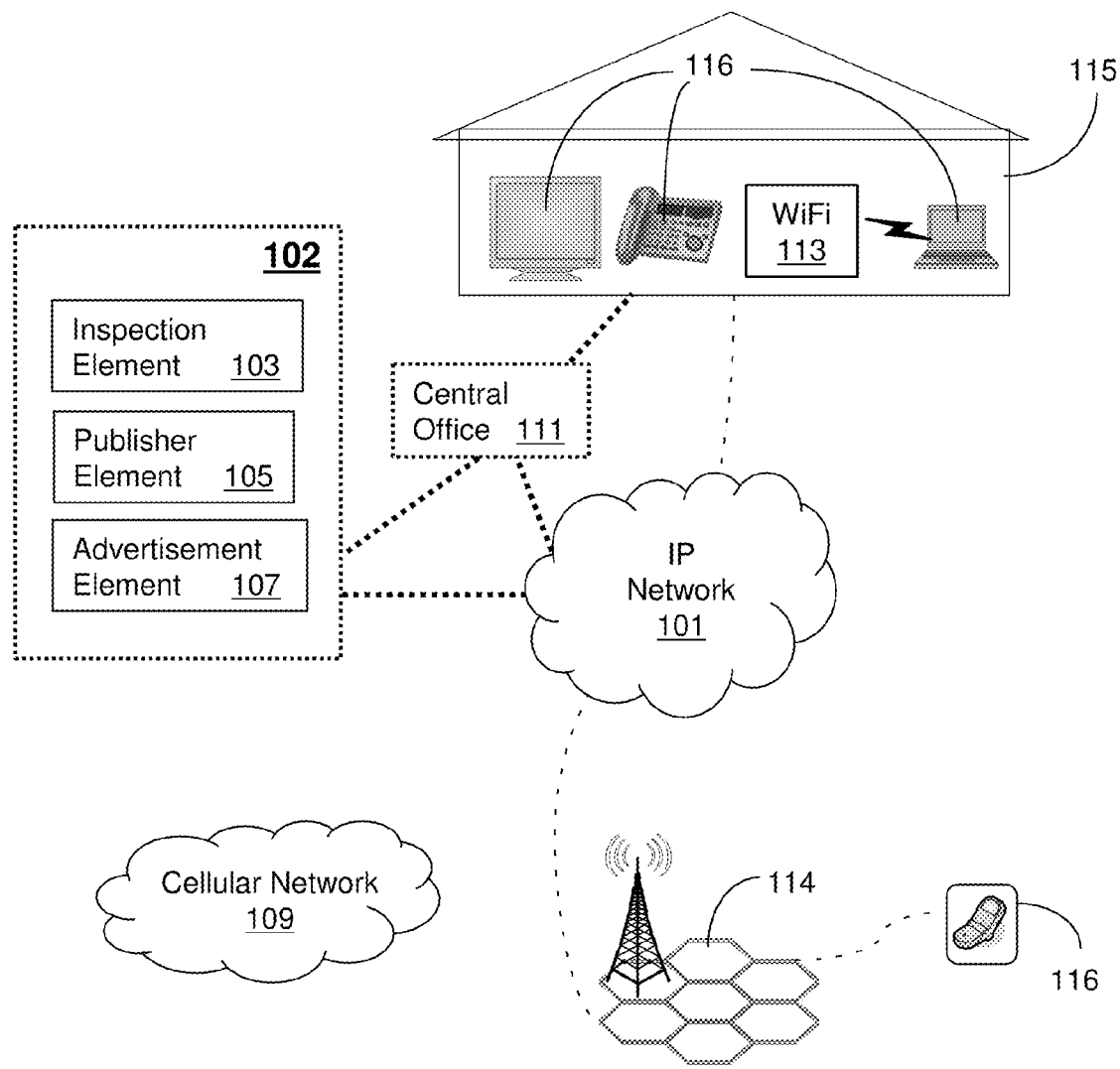
FIG. 1 depicts an exemplary embodiment of a communication system.

FIG. 1 depicts an exemplary embodiment of a communication system 100. The communication system 100 can comprise a number of wired and wireless access points (WAPs). In the case of wireline communications, the WAP can represent a central office 111 coupled to a building 115 by way of a distribution hub such as a service area interface (SAI) not shown in FIG. 1. The central office 111 can provide traditional circuit switched services to a plain old telephone service (POTS) terminal. An IP network 101 managed by an Internet Service Provider (ISP) supporting packetized voice, video, and data directed to messaging devices 116 such as an IPTV terminal, a Voice over IP (VoIP) terminal, and/or a computer communicating over for example a WiFi 113 or xDSL interface. Alternatively, such services can be an integral part of the services provided by the central office 111.

For wireless communications, a WAP can represent a plurality of wireless base stations 114 operating according to a frequency reuse architecture that provides over-the-air coverage to a large geographic region of roaming messaging devices 116.

Some of the messaging devices 116 can operate as multi-mode devices

Accordingly, said roaming devices can utilize POTS or VoIP services when in the building 115, or cellular services outside the building 115. A cellular network 109 can utilize circuit-switched technology for voice and data services such as GSM-GPRS, EDGE, CDMA-1X, EV/DO, UMTS, and other known and next generation cellular communications technologies.

Alternatively, or in combination, other wireless access technologies can be applied to the present disclosure such as Worldwide Interoperability for Microwave Access (WiMAX), ultra wide band (UWB), Bluetooth™, and software defined radio (SDR). SDR provides a means to access public and private communication spectrum with any number of communication protocols that can be dynamically downloaded over-the-air to the messaging devices 116. Other present and future generation wireless access technologies can also be applied to the present disclosure.

The communication system 100 can further comprise an inspection element 103, a publisher element 105, and an advertisement element 107. The inspection element 103 can represent hardware and/or software managed by for example an ISP that monitors packet traffic associated with messaging devices 116 of an end user. The publisher element 105 can represent a web server operated by a publisher that publishes content and advertisements by way of a website accessible to Internet users. The advertisement element 107 can represent hardware and/or software operated by an ad broker for supplying to the publisher element 105 advertisements which can be selected according to behavioral and/or content profiles derived from the inspection and publisher elements 103, 105 as will be described shortly. Once advertisements have been selected and forwarded to the publisher element 105, the publisher element 105 presents a web page to end users with the publisher's content and targeted advertisements. Advertisements can represent objects presented singly or combination as audible, still or moving images. It would be appreciated by one of ordinary skill in the art that the inspection, publisher, and advertisement elements 103, 105, 107 can operate singly or in any combination such as system 102.

Figure 2:
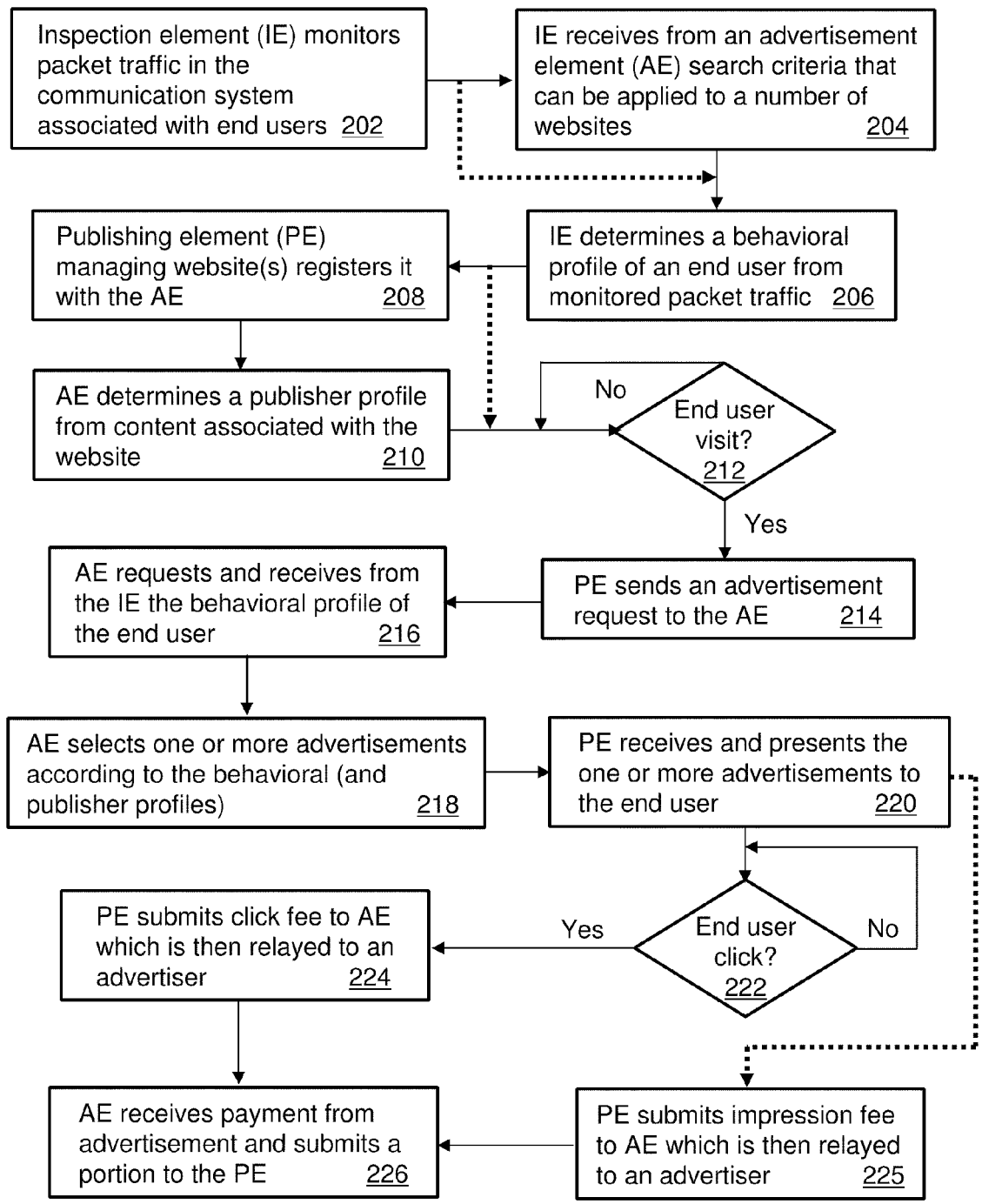
FIG. 2 depicts an exemplary method operating in the communication system.

FIG. 2 depicts an exemplary method 200 operating in portions of the communication system 100. Method 200 begins with step 202 in which the inspection element 103 monitors packet traffic in the communication system 100 for an end user. The inspection element 103 can utilize common inspection technology such as deep packet inspection (DPI) which can analyze packet traffic from any layer in an Open Systems Interconnection (OSI) model such as packet headers and payloads to assess the behavior of a target end user utilizing common market analysis tools. Alternatively, DPI can be applied to a Transmission Control Protocol/Internet Protocol (TCP/IP) applied to the packet traffic. Thus for each of its subscribers, the ISP can perform various levels of DPI analysis to determine a demographic and/or psychographic end user profile on the product and service interests of its subscriber base. With this information, the inspection element 103 can generate in step 206 a behavioral profile of each end user of the ISP.

In a supplemental embodiment, the inspection element 103 can receive in step 204 from the advertisement element 107, search criteria that can be applied to a number of websites. The search criteria can include a number of search terms (e.g., for cars, boats, clothing, accessories, computers, electronics, office supplies, home supplies, travel, etc.) which can be accompanied with search guidelines (e.g., if the end user visits a website related to cars, inspect the following keywords in the user's packets). Thus steps 202-204 can be combined as another means to perform market analysis on packet traffic and thereby generate a behavioral profile in step 206 for each end user of the ISP.

In step 208 the publisher element 105 can register one or more websites managed thereby with the advertisement element 107. In this step, the advertisement element 105 can be programmed to determine a publisher profile for each website by inspecting the content published thereby and determining from said content marketing patterns that identify ads having a high likelihood of targeting end user interests associated with said content. Thus with a publisher profile, and behavioral profiles for targeted end users, the advertisement element 105 can target subscribers of the ISP more precisely than prior art systems. In an alternative embodiment, steps 206 and 208 can be reversed in order. That is, the order of determining a publisher profile and a behavioral profile has no effect on the present disclosure. In yet another alternative embodiment, the inspection element 103 can proceed from step 206 to step 212 bypassing the need for determining a publisher profile. In this embodiment, the behavioral profile of each end user would be utilized alone to target ISP subscribers.

With the behavioral profile and publisher profile (if available), the publisher element 105 can be programmed in step 212 to check for end user visits to a website managed thereby. When an end user visit is detected, the publisher element 105 proceeds to step 214 where it submits an advertisement request to the advertisement element 107. The advertisement request can include a number of operational parameters such as an identity of the end user visiting the website (e.g., an IP address associated therewith), a script (e.g., a Java script), and/or physical and software constraints for presenting advertisements at a designated location in a web page of the website visited by the end user. The advertisement element 107 in step 216 requests from the inspection element 103 the behavioral profile of the end user visiting the website.

Once it is received, the advertisement element proceeds to step 218 where it selects one or more advertisements according to the behavioral profile (and the publisher profile if available). In step 220, the publisher element 105 receives and presents the one or more advertisements to the end user. The presentation of advertisements can be audio only, visual only, still or moving images, or combinations thereof. Once the advertisements are presented, the publisher element 105 can be programmed to track end user selections ("clicks") of said advertisements. If no clicks are detected, the publisher element 105 can be programmed not to submit fees for advertisements.

Figure 3:
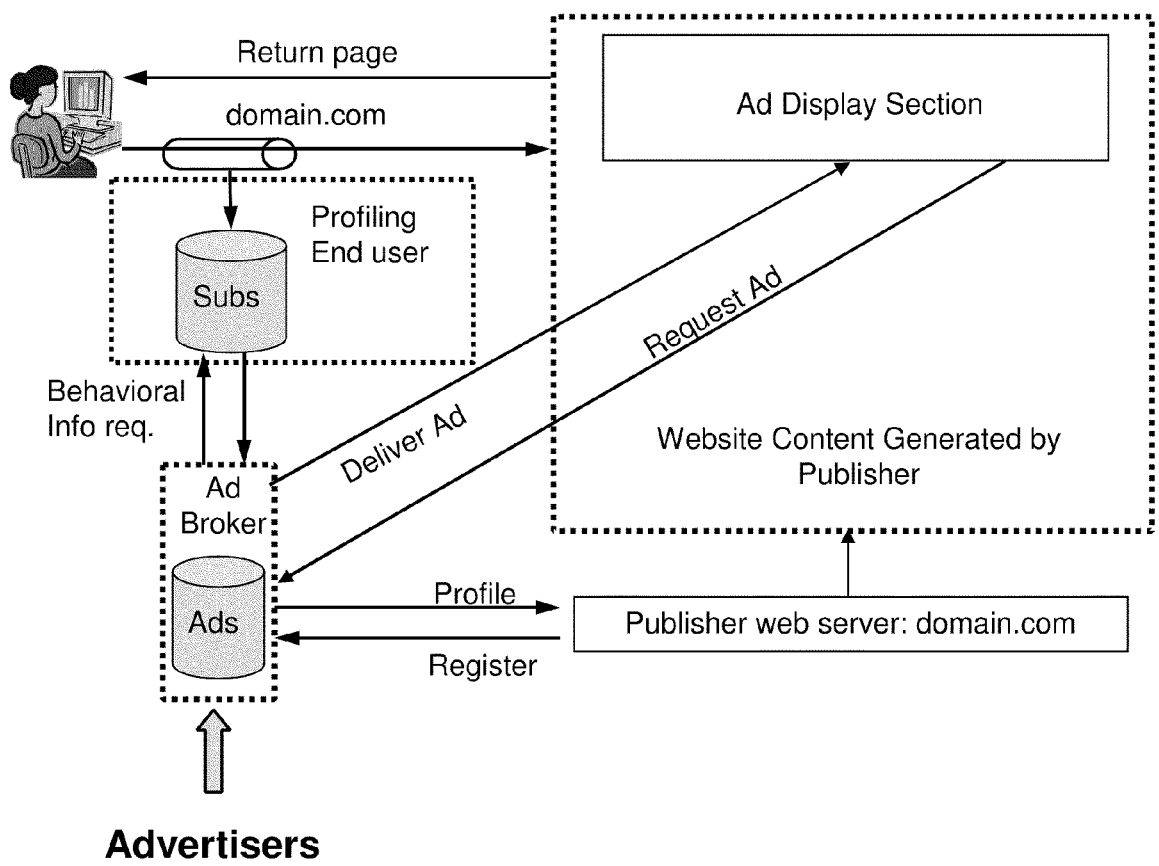
FIG. 3 depicts an exemplary block diagram of the operations depicted by the method of FIG. 2.

If on the other hand one or more advertisement selections are detected, the publishing element 105 proceeds to step 224 where it submits fee per click to the advertisement element 107, which relays said fee to a corresponding advertiser (a pay per click business model). Alternatively, step 224 can be modified so that click fees are accumulated over periodic payment intervals (e.g., month-to-month) and submitted to the advertisement element 107 and thereafter to the advertiser over said intervals. Upon receiving a payment from the advertiser, the advertisement element 107 in step 226 keeps a portion of the payment for fulfilling its brokerage services and submits the remainder to the publisher element 105. In an alternative embodiment, the publisher element 105 can be programmed to proceed from step 220 to step 225 where it submits an impression fee to the advertisement element which relays said fee to the advertiser (a pay per impression business model). Upon receiving payment, the advertisement element 107 performs revenue sharing as described in step 226. FIG. 3 depicts an exemplary block diagram of the operations depicted by the method 200.

It would be evident to an artisan with ordinary skill in the art that the aforementioned embodiments can be modified, reduced, or enhanced without departing from the scope and spirit of the claims described below. For example, method 200 can be applied in the context of an end user visiting a website from a cell phone or personal digital assistant rather than a computer. The advertisement model described above can be applied as a push rather than a pull business model. For instance, the advertisement element 107 can proactively submit an advertisement to the end user's messaging device 116 prior to the end user visiting a website based on its analysis of the behavioral profile supplied by the inspection element. Moreover, the order and timing of steps 202-225 can be modified without substantially changing the essence of the present disclosure These are but a few examples of other embodiments that can be read into the claims. Accordingly, the reader is directed to the claims below for a fuller understanding of the breadth and scope of the present disclosure.

Figure 4:
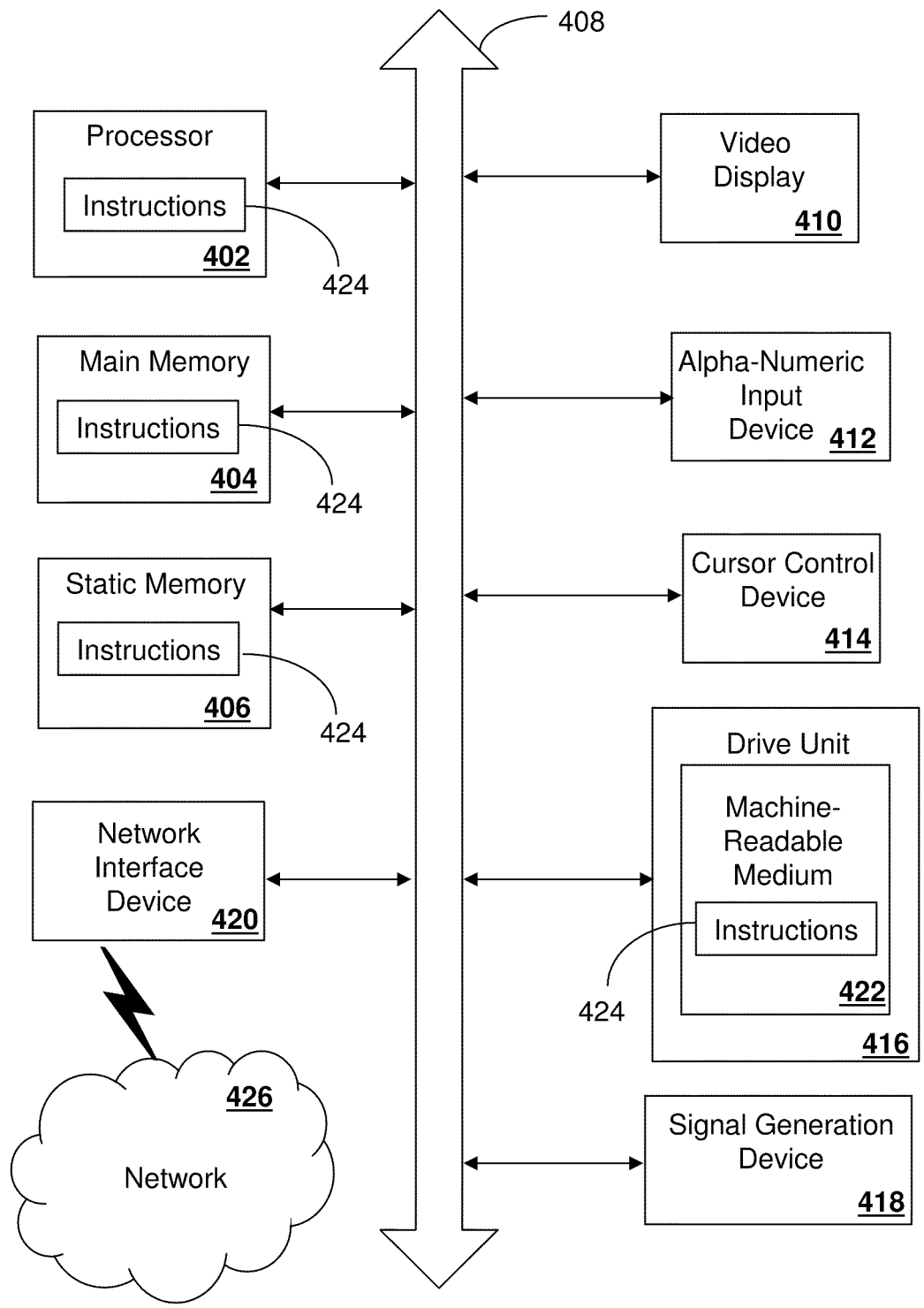
FIG. 4 depicts an exemplary diagrammatic representation of a machine in the form of a computer system within which a set of instructions, when executed, may cause the machine to perform any one or more of the methodologies disclosed herein.

FIG. 4 depicts an exemplary diagrammatic representation of a machine in the form of a computer system 400 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 400 may include a processor 402 (e.g., a central processing unit (CPU), a graphics processing unit (GPU, or both), a main memory 404 and a static memory 406, which communicate with each other via a bus 408. The computer system 400 may further include a video display unit 410 (e.g., a liquid crystal display (LCD), a flat panel, a solid state display, or a cathode ray tube (CRT)). The computer system 400 may include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 may include a machine-readable medium 422 on which is stored one or more sets of instructions (e.g., software 424) embodying any one or more of the methodologies or functions described herein, including those methods illustrated above. The instructions 424 may also reside, completely or at least partially, within the main memory 404, the static memory 406, and/or within the processor 402 during execution thereof by the computer system 400. The main memory 404 and the processor 402 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 424, or that which receives and executes instructions 424 from a propagated signal so that a device connected to a network environment 426 can send or receive voice, video or data, and to communicate over the network 426 using the instructions 424. The instructions 424 may further be transmitted or received over a network 426 via the network interface device 420.

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions to:
monitor packet traffic associated with an end user from one or more network elements of a communication system providing communication services to a messaging device of the user causing the packet traffic, the communication services being provided to the messaging device by a first entity;
determine a behavioral profile of the end user from the monitored packet traffic; and
submit to an advertisement element the behavioral profile, wherein the advertisement element is operated by a second entity different from the first entity.

2. The non-transitory computer-readable storage medium of claim 1, comprising computer instructions to:
receive search criteria from the advertisement element;
detect a website selection by the end user;
monitor according to a deep packet inspection process packet traffic associated with the website according to the search criteria;
determine from the monitored packet traffic at least one among a demographic profile and a psychographic profile associated with the end user; and
update the behavioral profile according to at least one among said profiles.

3. The non-transitory computer-readable storage medium of claim 1, comprising computer instructions to monitor at least one layer of a protocol conforming to one among an Open Systems Interconnection (OSI) model and a Transmission Control Protocol/Internet Protocol (TCP/IP) applied to the packet traffic.

4. The non-transitory computer-readable storage medium of claim 1, comprising computer instructions to monitor the packet traffic according to a deep packet inspection process.

5. The non-transitory computer-readable storage medium of claim 1, comprising computer instructions to monitor at least one among headers and payloads of the packet traffic.

6. The non-transitory computer-readable storage medium of claim 1, wherein the behavioral profile comprises at least one among a demographic profile and a psychographic profile.

7. The non-transitory computer-readable storage medium of claim 1, comprising computer instructions to:
receive search criteria from the advertisement element;
detect a website selection by the end user;
monitor packet traffic associated with the website according to the search criteria; and
update the behavioral profile according to the monitored packet traffic.

8. The non-transitory computer-readable storage medium of claim 7, wherein the search criteria comprises search terms with associated search guidelines.

9. The non-transitory computer-readable storage medium of claim 1, comprising computer instructions to:
monitor packet traffic associated with advertisement information supplied by the advertisement element to a web server operating a website; and
update the behavioral profile according to the monitored packet traffic.

10. A system, comprising:
a network interface device that interfaces with a communication system; and
a controller to manage operations of the network interface device, the controller being operated by a first entity, wherein the controller determines a behavioral profile of an end user from packet traffic monitored via the network interface device and generated by activities of the end user that are associated with the communication system and wherein the controller shares the behavioral profile with an advertisement element for distributing targeted advertisements to the end user according to the behavioral profile, wherein the advertisement element is operated by a second entity different from the first entity.

11. The system of claim 10, wherein the controller is operable to:
receive search criteria from the advertisement element;
detect a website selection by the end user;
monitor packet traffic associated with the website according to the search criteria; and
determine from the monitored packet traffic the behavioral profile.

12. The system of claim 11, wherein the search criteria comprises search terms with associated search guidelines.

13. The system of claim 10, wherein the controller is operable to monitor at least one layer of a protocol in the packet traffic.

14. The system of claim 10, wherein the controller is operable to determine the behavioral profile from the packet traffic according to a deep packet inspection process.

15. The system of claim 10, wherein the controller is operable to monitor at least one among headers and payloads of the packet traffic to determine the behavioral profile.

16. The system of claim 10, wherein the behavioral profile comprises at least one among a demographic profile and a psychographic profile.

17. A method, comprising:
determining a behavioral profile of an end user from monitored packet traffic initiated by the end user, the behavioral profile being determined by a controller operated by a first entity; and
providing one or more systems access to the behavioral profile to identify an advertisement, wherein the one or more systems are operated by a second entity different from the first entity.

18. The method of claim 17, comprising receiving search criteria from the one or more systems to determine the behavioral profile from the packet traffic.

19. The method of claim 17, comprising detecting the packet traffic from one or more website selections by the end user.

20. The method of claim 17, comprising determining the behavioral profile by monitoring at least one layer of a protocol used by the packet traffic.

* * * * *